US011091128B1

(12) United States Patent
Alonso et al.

(10) Patent No.: US 11,091,128 B1
(45) Date of Patent: Aug. 17, 2021

(54) SYSTEM TO CLEAN VEHICLE WINDSHIELDS AND WINDOWS USING PNEUMATIC PRESSURE

(71) Applicants: Rewal Alonso, Miramar, FL (US); Josue Castro, Miramar, FL (US)

(72) Inventors: Rewal Alonso, Miramar, FL (US); Josue Castro, Miramar, FL (US)

( * ) Notice: Subject to any disclaimer, the term of this patent is extended or adjusted under 35 U.S.C. 154(b) by 132 days.

(21) Appl. No.: 16/522,991

(22) Filed: Jul. 26, 2019

(51) Int. Cl.
*B60S 1/54* (2006.01)
*B60S 1/58* (2006.01)

(52) U.S. Cl.
CPC .. *B60S 1/54* (2013.01); *B60S 1/58* (2013.01)

(58) Field of Classification Search
CPC ..................................... B60S 1/54; B60S 1/58
USPC .................. 15/313, 250.001, 250.01, 250.02
See application file for complete search history.

(56) References Cited

U.S. PATENT DOCUMENTS

| | | | |
|---|---|---|---|
| 2,746,100 A * | 5/1956 | Nallinger ................. | B60S 1/586 454/123 |
| 3,366,336 A * | 1/1968 | Neuschwanger ........ | B60H 1/18 239/129 |
| 5,097,563 A * | 3/1992 | Cowan ..................... | B60S 1/56 15/250.001 |
| 7,080,872 B1 | 7/2006 | Simonowits | |
| 2014/0117701 A1* | 5/2014 | Davis ...................... | B60R 1/0602 296/96.15 |
| 2017/0259788 A1* | 9/2017 | Villa-Real ................ | B08B 3/02 |

FOREIGN PATENT DOCUMENTS

WO  WO-9214634 A1 * 9/1992 ................ B60S 1/54

\* cited by examiner

*Primary Examiner* — Orlando E Aviles
*Assistant Examiner* — Thomas Raymond Rodgers
(74) *Attorney, Agent, or Firm* — Sanchelima & Associates, P.A.; Christian Sanchelima; Jesus Sanchelima

(57) ABSTRACT

A system to clean windshields using pneumatic pressure including a blower assembly and a vent assembly is disclosed herein. The blower assembly comprises a plurality of self-contained blowers including an intake duct and an exhaust duct mounted within a vehicle. The self-contained blowers carry air through air ducts to the vent assembly mounted to the exterior of the vehicle. The air supplied from the plurality of self-contained blowers dry the windshields of water and debris without obscuring the vision of a driver within the vehicle. Additionally, the vent assembly includes a front windshield vent, a rear windshield vent and side window vents mounted onto the exterior of a vehicle. The system creates an invisible air curtain to act as a barrier to prevent any rain, snow, or debris of any type to come in contact with the windshields of a vehicle.

1 Claim, 3 Drawing Sheets

SYSTEM TO CLEAN VEHICLE WINDSHIELDS AND WINDOWS USING PNEUMATIC PRESSURE

BACKGROUND OF THE INVENTION

1. Field of the Invention

The present invention relates to a windshield blower and, more particularly, to a system to clean windshields using pneumatic pressure that comprises a plurality of self-contained blowers mounted to a vehicle configured to blow air onto the windshields of a vehicle to clean them of rain and snow.

2. Description of the Related Art

Several designs for a windshield blower system have been designed in the past. None of them, however, include a centrifugal blower or fan which is mounted at the base of the outside of a vehicle windshield, and has a blowing cone which covers nearly 180 degrees. It is known that vehicles have a need to clear water and debris that may end up on the windshields and windows of said vehicle. It is also known that the current windshield wipers mounted onto vehicles obscure the road vision of a driver when in use. The present invention addresses this issue by providing an invisible air curtain to act as a barrier to prevent any rain, snow, or debris of any type to come in contact with the windshields of a vehicle. The present invention further addresses these issues by introducing a system to clean windshields using pneumatic pressure to clear water and debris from a windshield without obscuring the road view of a driver.

Applicant believes that a related reference corresponds to U.S. Pat. No. 7,080,872 for a forced air wiper replacement system. However, it differs from the present invention because the reference fails to address the issue of providing a system to clean windshields using pneumatic pressure system capable of simultaneously blow-drying all windshields of an auto-mobile vehicle. The present invention addresses this issue by providing a vent assembly comprising a front windshield vent, a rear windshield vent, and side window windshield vents adapted to supply air to all windshields to remove water and debris. The present invention furthermore is configured to create an invisible air curtain to act as a barrier to prevent any rain, snow, or debris of any type to come in contact with the windshields of a vehicle.

Other documents describing the closest subject matter provide for a number of more or less complicated features that fail to solve the problem in an efficient and economical way. None of these patents suggest the novel features of the present invention.

SUMMARY OF THE INVENTION

It is an object of the present invention to provide an invisible air curtain to act as a barrier to prevent any rain, snow, or debris of any type to come in contact with the windshields of a vehicle.

It is another object of the present invention to provide a system to clean windshields using pneumatic pressure that can efficiently blow-dry water and debris from windshields on a vehicle.

It is another object of this invention to provide a system to clean windshields using pneumatic pressure configured to function within any type of weather to assist a driver in removing water and debris from the windshields of a vehicle.

It is still another object of the present invention to provide a system to clean windshields using pneumatic pressure adapted to simultaneously blow-dry all windshields of a vehicle without obscuring the road view of a driver thereby increasing the safety on roads.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
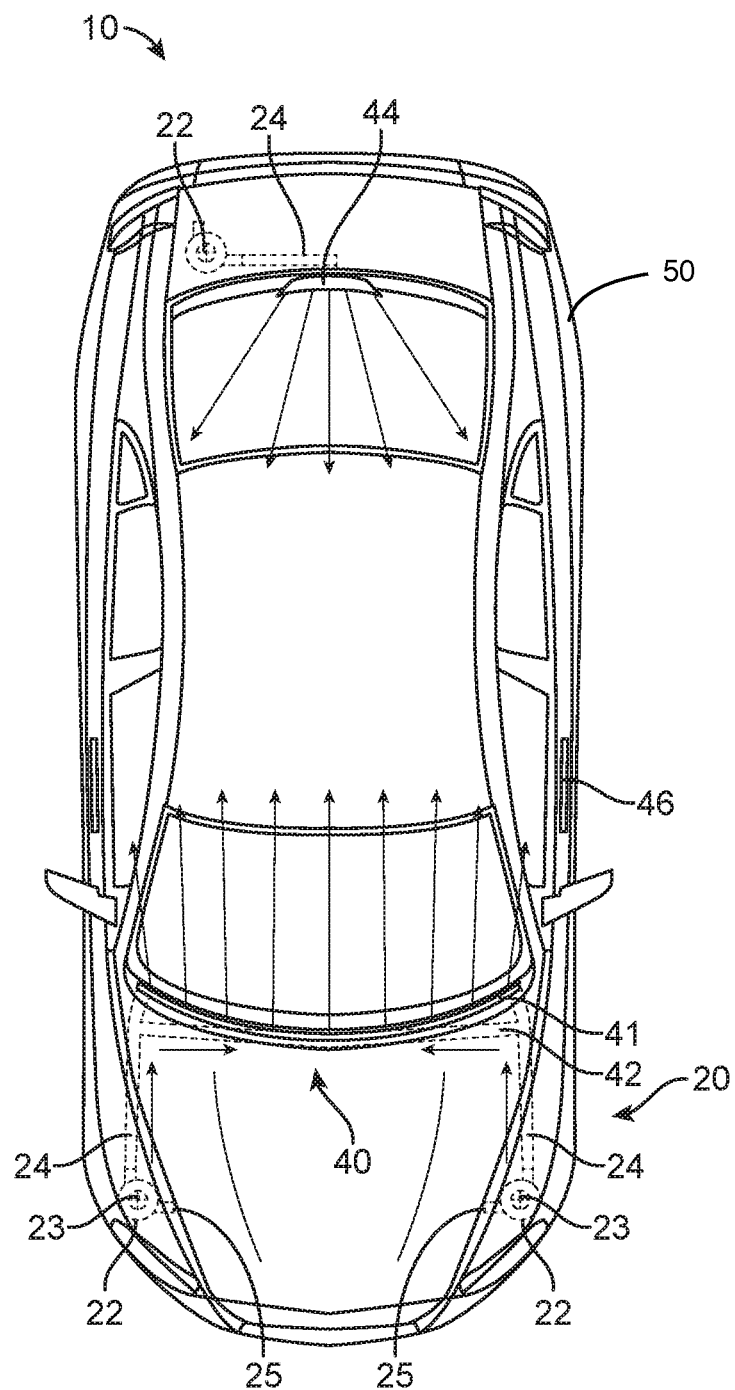
FIG. 1 represents a top view of a vehicle 50 with an interior view of blower assembly 20 and an exterior view of vent assembly 40.
Figure 2:
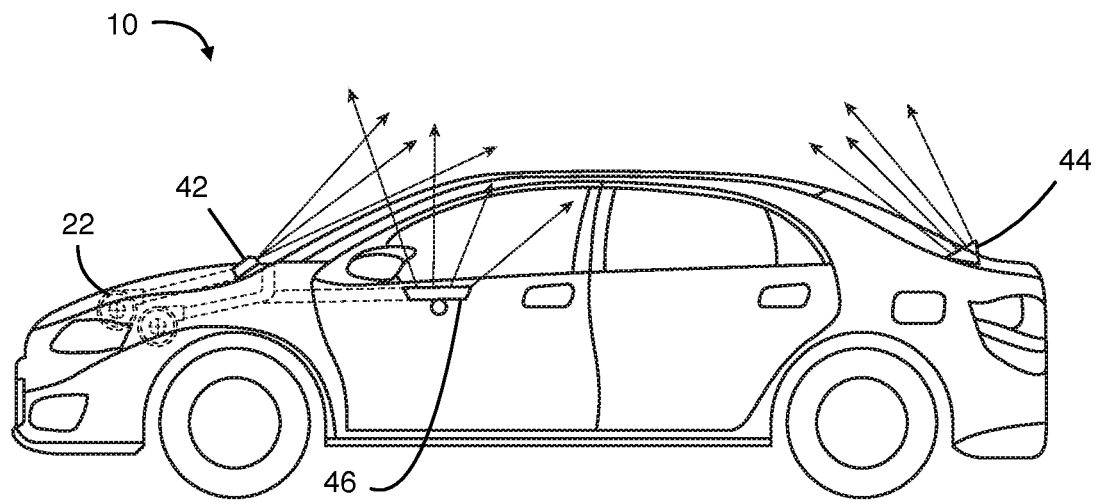
FIG. 2 shows a side view of a vehicle 50 depicting interior components of blower assembly 20 and exterior side window vents 46 mounted on said vehicle 50.
Figure 3:
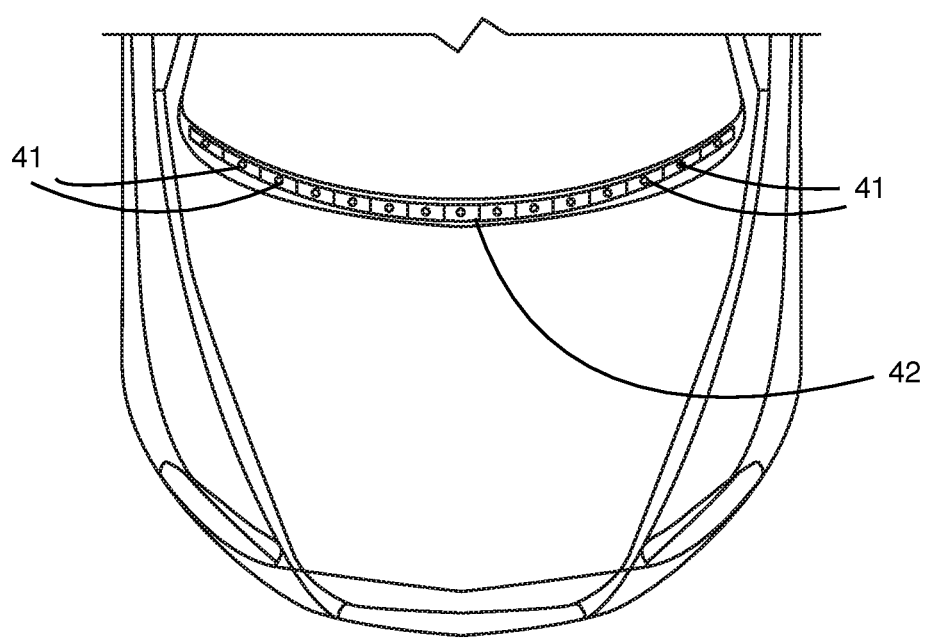
FIG. 3 illustrates an enlarged view of front windshield vent 42 mounted on said vehicle 50.
Figure 4:
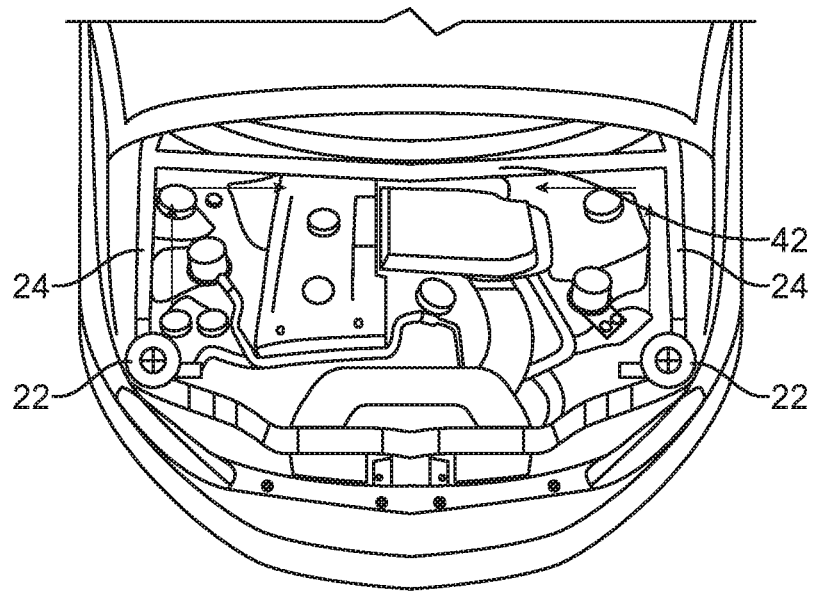
FIG. 4 is a representation of an enlarged interior view of a hood of said vehicle 50 depicting blower assembly 20 mounted within.
Figure 5:
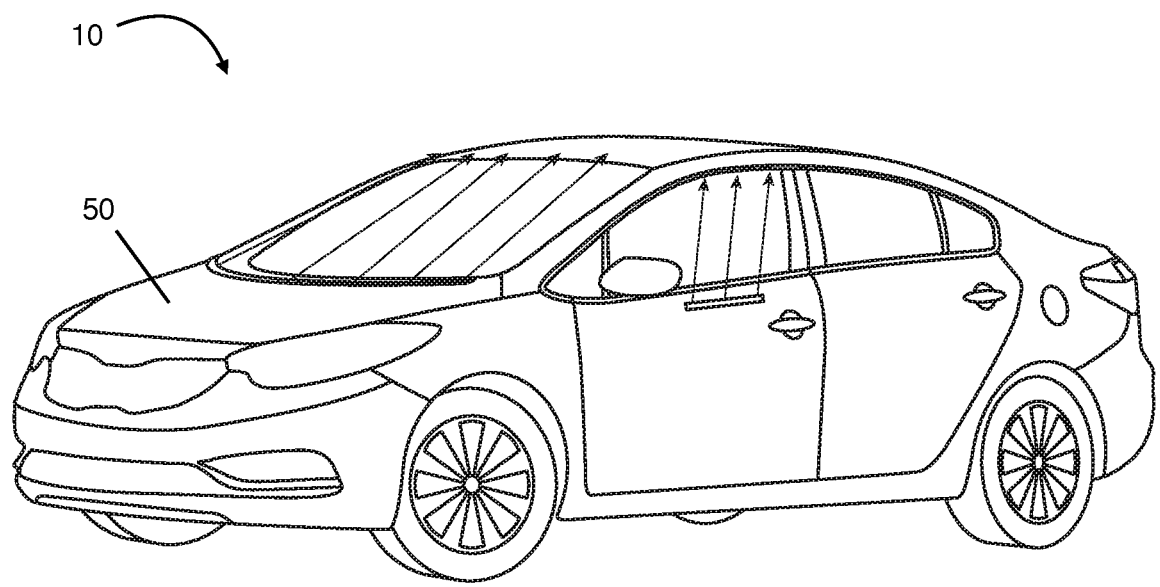
FIG. 5 represents an isometric view of the system to clean windshields using pneumatic pressure 10 in use on a vehicle 50 with arrows depicting air flow onto windshields.

Referring now to the drawings, where the present invention is generally referred to with numeral 10, it can be observed a system to clean windshields using pneumatic pressure 10 that basically includes a blower assembly 20, and a vent assembly 40 mounted onto a vehicle 50.

Blower assembly 20 includes a plurality of self-contained blowers 22 and air ducts 24. Plurality of self-contained blowers further includes an intake duct 23 and an exhaust duct 25 on each self-contained blower. Plurality of self-contained blowers may be mounted within the interior of said vehicle 50. The present embodiment depicts two blowers of the plurality of self-contained blowers 22 mounted to the interior hood of vehicle 50. Additionally, the present embodiment depicts one of the blowers from the plurality of blowers 22 to be mounted within the interior of a trunk within vehicle 50. Plurality of self-contained blowers 22 may be mounted within interior hood of vehicle 50 through means of fasteners, adhesives, welding, and the like. It should be understood that any number of blowers from the plurality of self-contained blowers 22 may be mounted onto vehicle 50 and is not limited to the number of blowers of the present embodiment. Air ducts 25 are mounted to the distal end of exhaust duct 25 of each self-contained blower. Blower assembly 20 provides air to create an invisible air curtain to act as a barrier to prevent any rain, snow, or debris of any type to come in contact with the windshields of a vehicle 50.

The intake duct 23 of said plurality of self-contained blowers 22 take in air and outputs said air through exhaust duct 25. Exhaust duct 25 then carries said air therethrough air ducts 24 to be distributed to vent assembly 40. Plurality of self-contained blowers 22 are configured to provide the necessary air pressure needed to dry water and remove debris to vent assembly 40. Additionally, a user may be capable of engaging each self-contained blower independently or simultaneously.

Vent assembly 40 includes a front windshield vent 42, a rear windshield vent 44, and side window vents 46 located on the exterior of said vehicle 50. Front windshield vent 42 is located along the upper proximal end of a hood of said vehicle 50. Front windshield vent 42 may be in a shape that cooperates with the shape of said hood. Additionally, front windshield vent 42 extends from the top left distal end to the top right distal end of said hood of said vehicle 50. Side window vents 46 are located along the upper proximal edge of side doors of said vehicle 50. Side window vents 46 have a shape that cooperates with the shape of the side doors of said vehicle 50. Rear windshield vents 44 is located along the upper proximal end or edge of a trunk of said vehicle 50. Rear windshield vents 44 comprises a shape that cooperates with the shape of said trunk of said vehicle 50. The aforementioned vents may be mounted to said vehicle 50 through means of fasteners, adhesives, welding and the like. Additionally, the aforementioned vents receive airducts 24 thereby being supplied air from said plurality of self-contained air blowers 22. Furthermore, the aforementioned vents may be made of any suitable material to withstand the air pressure being received from the plurality of self-contained blowers. In one embodiment of the present invention, said vent assembly 40 is configured to automatically start up when said vehicle 50 is also started so as to clean any residual water and debris present on the windshields. In yet another embodiment of the present invention, said system to clean windshields using pneumatic pressure 10 may be communicably mounted with existing sensors on said vehicle 50 to automatically blow air when said sensors sense rain or debris on the windshields. Additionally, said vent assembly 40 may be configured to work within varying weather conditions that are determined by said sensors.

The plurality of self-contained blowers 22 intake air to be funneled to vent assembly 40 through means of air ducts 24. Additionally, vent assembly 40 further comprises a plurality of air nozzles 41. Plurality of air nozzles 41 section air received to vent assembly 40. The air is then utilized to blow-dry and remove debris from the windshields of said vehicle 50. Additionally, plurality of self-contained blowers 22 may simultaneously activated so as to blow-dry and remove debris from the windshields of vehicle 50 simultaneously. In another embodiment of the present invention, said plurality of air nozzles 41 may be configured to oscillate within said vent assembly 40. In one embodiment, air nozzles 41 are configured to blow pressurized air against the bottom of the windshield and continue to blow pressurized air towards the top of the windshield, thereby, removing water and debris on the way up. Air nozzles 41 upon reaching their highest point then begin to blow pressurized air against the windshield as it performs a second sweep to ensure that the water and debris remaining is also removed. Additionally, the temperature of air being supplied to said vent assembly 40 may be adjusted depending on the temperature environment of said vehicle 50. This could be helpful to remove frost from the windshields, for instance. This configuration for air nozzles 41 can be done for the front and rear windshields alike in addition to the side windows of said vehicle 50. System to clean vehicles using pneumatic pressure 10 is configured to create an invisible air curtain to act as a barrier to prevent any rain, snow, or debris of any type to come in contact with the windshields of a vehicle 50. The present embodiment depicts vehicle 50 as being an automobile vehicle. However, it should be understood that system to clean vehicles using pneumatic pressure 10 may be mounted onto any vehicle such as planes, trucks, trains and the like.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:
1. A system to clean windshields using pneumatic pressure, consisting of:
   a) a blower assembly including a first blower, a second blower, and a third blower, each blower further including an intake duct and an exhaust duct, each blower being self-contained, the first blower and the second blower being located in opposing corners of a front side of a hood interior of a vehicle, said first blower and the second blower supply air to air ducts that line both lateral sides of said hood interior, the air ducts leading air to a forked air duct portion, said forked air duct portion channeling the air from the first blower and the second blower towards a front windshield, a driver side windshield, and a passenger side windshield, a third blower internally mounted to a corner of a trunk interior, wherein said third blower supplies air to a trunk mounted air duct, said trunk mounted air duct channeling air towards a rear windshield; and
   b) a vent assembly including a front windshield vent located along a front windshield bottom edge, a rear windshield vent located along a rear windshield bottom edge, side windshield vents located along a passenger side windshield bottom edge and a driver side windshield bottom edge, wherein each of the front windshield vent, the rear windshield vent, and the side windshield vents each includes a plurality of air nozzles mounted to said vents, the air nozzles including a circular opening to expel air therefrom, wherein said plurality of air nozzles distribute air evenly to windshields of said vehicle;
   wherein said pneumatic pressure creates an invisible air curtain to act as a barrier to prevent any rain, snow, or debris of any type to come in contact with the exterior of the windshields of the vehicle.

* * * * *